(12) United States Patent
Wenger (10) Patent No.: US 10,021,832 B2
(45) Date of Patent: Jul. 17, 2018

(54) ROW DIVIDER HAVING A CONVEYOR FOR AN AGRICULTURAL HARVESTER

(71) Applicant: CNH Industrial America LLC, New Holland, PA (US)

(72) Inventor: Bradley Wenger, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 88 days.

(21) Appl. No.: 14/831,415

(22) Filed: Aug. 20, 2015

(65) Prior Publication Data
US 2017/0049056 A1 Feb. 23, 2017

(51) Int. Cl.
| | | |
|---|---|---|
| A01D 45/02 | (2006.01) | |
| A01D 57/06 | (2006.01) | |
| A01D 57/01 | (2006.01) | |
| A01D 57/22 | (2006.01) | |
| A01D 65/00 | (2006.01) | |
| A01D 101/00 | (2006.01) | |

(52) U.S. Cl.
CPC ............ *A01D 57/06* (2013.01); *A01D 45/021* (2013.01); *A01D 57/01* (2013.01); *A01D 57/22* (2013.01); *A01D 65/00* (2013.01); *A01D 2101/00* (2013.01)

(58) Field of Classification Search
CPC .. A01D 45/021; A01D 43/082; A01D 45/025; A01D 57/22; A01D 63/02; A01D 65/00
See application file for complete search history.

(56) References Cited

U.S. PATENT DOCUMENTS

| | | | | |
|---|---|---|---|---|
| 675,174 A | | 5/1901 | Still | |
| 1,219,327 A | * | 3/1917 | Keeler | ................. A01D 45/021 56/106 |
| 1,306,317 A | * | 6/1919 | St John | ................ A01D 45/021 56/111 |
| 1,392,258 A | * | 9/1921 | Mayer | .................... A01D 45/10 104/178 |

(Continued)

FOREIGN PATENT DOCUMENTS

| | | | | |
|---|---|---|---|---|
| DE | 3231953 A1 | * | 3/1984 | ............ A01D 45/02 |
| FR | 2861537 A1 | | 5/2005 | |
| WO | 2011130678 A1 | | 10/2011 | |

OTHER PUBLICATIONS

European Search Report; 16184670.4-1656; dated Jan. 4, 2017.

*Primary Examiner* — Arpad Fabian-Kovacs
(74) *Attorney, Agent, or Firm* — Peter K. Zacharias; Patrick M. Sheldrake (57) ABSTRACT

A corn header for a combine harvester capable of lifting stalks that have fallen sideways in a row is provided. The corn header includes a frame, a plurality of row units and a plurality of row dividers for guiding crop plants toward the row units. The frame is mounted to a forward end of the combine harvester. The plurality of row units extends forward from the frame. Each row divider is connected to and extends forward of at least one row unit, and includes a conveyor connected to a lateral side of the row divider for the purpose of lifting and propelling crop plants into the corn header. In a preferred embodiment, the conveyor is an auger including a helical flight having a non-circular profile or a plurality of notches to increase its ability to lift and propel crop plants into the corn header.

19 Claims, 8 Drawing Sheets

(56) References Cited

U.S. PATENT DOCUMENTS

| | | | |
|---|---|---|---|
| 1,722,717 A * | 7/1929 | Trottman | A01D 45/02 56/10.7 |
| 1,855,109 A * | 4/1932 | Justman | A01D 45/021 56/110 |
| 1,901,099 A * | 3/1933 | Hale | A01D 45/02 56/102 |
| 1,922,374 A * | 8/1933 | Krause | A01D 45/02 56/13.3 |
| 1,968,998 A * | 8/1934 | Elliott | A01D 45/02 56/13.5 |
| 2,205,707 A | 6/1940 | Wooding, Jr. | |
| 2,252,377 A * | 8/1941 | Hyman | A01D 45/021 56/119 |
| 2,351,807 A * | 6/1944 | Court | A01D 45/028 56/13.3 |
| 2,471,771 A | 5/1949 | Parks et al. | |
| 2,542,573 A * | 2/1951 | Rosenthal | A01D 45/021 56/111 |
| 2,648,944 A * | 8/1953 | Powers | A01D 45/10 56/119 |
| 2,854,806 A | 10/1958 | Slavens | |
| 3,173,236 A * | 3/1965 | Byrd | A01D 57/00 56/119 |
| 3,294,133 A * | 12/1966 | Claas | A01D 41/14 241/247 |
| 3,325,982 A * | 6/1967 | Fogels | A01D 45/10 56/11.2 |
| 3,331,196 A * | 7/1967 | Grant | A01D 45/021 56/106 |
| 3,499,272 A | 3/1970 | Looker | |
| 3,508,387 A * | 4/1970 | Wright | A01D 41/14 56/95 |
| 3,584,444 A | 6/1971 | Sammann et al. | |
| 3,640,055 A * | 2/1972 | Looker | A01D 45/02 415/211.1 |
| 3,646,737 A * | 3/1972 | Grant | A01D 45/021 56/106 |
| 3,705,482 A * | 12/1972 | Purrer | A01D 43/082 56/13.9 |
| 3,759,021 A | 9/1973 | Schreiner et al. | |
| 3,771,300 A | 11/1973 | Jourdan | |
| 3,791,114 A * | 2/1974 | Fowler | A01D 45/10 56/13.9 |
| 3,803,820 A * | 4/1974 | Knapp | A01D 45/021 56/98 |
| 3,807,152 A * | 4/1974 | Storm | A01D 45/021 56/98 |
| 3,808,783 A | 5/1974 | Sutherland et al. | |
| 3,919,830 A * | 11/1975 | Gerber | A01D 43/082 56/119 |
| 4,035,996 A * | 7/1977 | Fernandez | A01D 45/10 56/13.9 |
| 4,137,695 A * | 2/1979 | Sammann | A01D 65/00 56/106 |
| 4,154,047 A * | 5/1979 | Quick | A01D 45/10 56/13.9 |
| 4,215,527 A * | 8/1980 | Shriver | A01D 43/082 56/98 |
| 4,266,394 A * | 5/1981 | VanGinhoven | A01D 43/082 56/119 |
| 4,343,140 A * | 8/1982 | Hegger | A01D 41/14 56/10.4 |
| 4,346,548 A * | 8/1982 | Atkinson | A01D 45/021 56/119 |
| 4,429,516 A * | 2/1984 | Erickson | A01D 57/22 56/119 |
| 4,470,244 A | 9/1984 | Leigers | |
| 4,476,667 A | 10/1984 | Moss | |
| 4,567,717 A * | 2/1986 | Manton | A01D 43/082 56/119 |
| 4,584,825 A * | 4/1986 | Atkinson | A01D 45/021 56/119 |
| 5,195,309 A | 3/1993 | Mossman | |
| 5,775,076 A * | 7/1998 | Mossman | A01D 45/021 56/119 |
| 5,913,803 A * | 6/1999 | Moster | A01D 45/021 460/114 |
| 6,032,444 A * | 3/2000 | Herron | A01D 43/082 56/102 |
| 6,341,481 B1 * | 1/2002 | van der Merwe | A01D 45/021 56/110 |
| 6,625,969 B2 | 9/2003 | Glazik | |
| 6,925,790 B1 * | 8/2005 | Krone | A01B 73/044 56/51 |
| 7,043,891 B2 * | 5/2006 | Rickert | A01D 63/02 56/119 |
| 7,073,316 B2 | 7/2006 | Resing et al. | |
| 7,240,471 B2 | 7/2007 | Mossman | |
| 7,373,767 B2 | 5/2008 | Calmer | |
| 7,419,048 B2 * | 9/2008 | Weiand | A01D 61/004 198/662 |
| 7,752,829 B1 * | 7/2010 | Rottinghaus | A01D 45/021 56/110 |
| 7,814,737 B2 | 10/2010 | Pierson | |
| 7,874,134 B1 | 1/2011 | Hoffman | |
| 7,913,480 B2 | 3/2011 | Christensen et al. | |
| 8,413,413 B2 * | 4/2013 | Lohrentz | A01D 45/021 56/95 |
| 8,567,168 B2 * | 10/2013 | Allochis | A01D 63/02 56/109 |
| 8,646,250 B2 * | 2/2014 | Lohrentz | A01D 45/021 56/109 |
| 9,603,304 B2 * | 3/2017 | Lambertini | A01D 45/021 |
| 2004/0107685 A1 * | 6/2004 | Resing | A01D 63/02 56/119 |
| 2004/0231309 A1 * | 11/2004 | Rickert | A01D 63/02 56/119 |
| 2011/0277436 A1 * | 11/2011 | Allochis | A01D 63/02 56/109 |
| 2014/0165522 A1 * | 6/2014 | Braunbeck | A01D 45/10 56/10.6 |
| 2016/0242357 A1 * | 8/2016 | Mastalir | A01D 51/005 |

\* cited by examiner

ROW DIVIDER HAVING A CONVEYOR FOR AN AGRICULTURAL HARVESTER

BACKGROUND

The subject application relates generally to corn headers used with combine harvesters. In particular, the subject application relates to an improved corn header having a row divider with a conveyor that lifts a down crop up off the ground and then propels the crop plants rearward into the combine harvester.

An agricultural combine is a machine used to harvest a variety of crops from a field. During a harvesting operation of, e.g., corn, a corn header at the front of the combine cuts ripened crop from the field. A feederhouse then transfers the crop material into the combine. Threshing and separating assemblies within the combine remove grain from the crop material and transfer the clean grain to a grain tank for temporary holding. Crop material other than grain (MOG) exits from the rear of the combine. An unloading auger transfers the clean grain from the grain tank to a truck or grain cart for transport, or to another receiving bin on or off machine for holding.

Combines that harvest corn are provided with row dividers for directing rows of corn stalks to ear separation chambers or stripping plates and then to an auger for conveying the corn to the feederhouse of the combine. Conventional corn headers rely on the forward motion of the tapered row divider to lift and move crop plants into the combine. However, sometimes a portion of a down crop will fall sideways in a row, making such stalks difficult for conventional corn headers to lift. This situation results in economic loss either when the unprocessed stalks are damaged when they are run over by the combine, or when a second pass needs to made for another attempt at lifting the overrun stalks.

Thus, there is a need for a combine harvester that is capable of reliably lifting down crop even when significant numbers of the crop plants may have fallen at irregular angles from a crop row. This need is satisfied by the subject application of a row divider having a conveyor for an agricultural harvester.

BRIEF SUMMARY OF THE INVENTION

In accordance with a preferred aspect, the subject application provides a corn header for a combine harvester that includes a frame, a plurality of row units and a plurality of row dividers. The frame mounts to a forward end of the combine harvester. The plurality of row units extends forward from the frame. Each of the plurality of row dividers is connected to and extends forward of at least one row unit. Each row divider includes a conveyor connected to a lateral side of the row divider. The row divider conveyor is configured to lift a down crop up off the ground and then propel the crop plants rearward into the header for processing.

In accordance with a second aspect, the subject application provides a row divider for an agricultural combine corn header that includes a front portion, a rear portion, and a conveyor. The front portion is for guiding and conveying crop material into the header and extends forwardly from the rear portion. The rear portion is for connecting the row divider to a frame of the corn header. The front portion includes lateral side surfaces that taper outwardly from a front end of the front portion towards the rear portion. The conveyor is attached to one of the lateral sides of the front portion for lifting and propelling crop material into the header.

In accordance with a third aspect, the subject application provides a row divider for an agricultural combine corn header that includes a conveyor attached to one or both lateral sides of the row divider. The conveyor may be attached such that a longitudinal axis of the conveyor forms an acute angle from a horizontal plane. The conveyor can e.g., be an auger that includes a motor operatively connected to the conveyor for providing a motive torque force.

In contrast to current construction of conventional row divides which consists of a divider and a point that divides the crop and can scoop underneath of the down crop to pick it up if it has fallen sideways in the row, the design of the subject application will have a small auger on both sides of the divider in order to begin moving the crop up off the ground and convey it into the stalk rolls of the corn header. Having a small auger on both sides of the divider will begin moving the crop up off the ground and convey it into the stalk rolls of the corn header.

BRIEF DESCRIPTION OF THE SEVERAL VIEWS OF THE DRAWINGS

The foregoing summary, as well as the following detailed description of the aspects of the subject application, will be better understood when read in conjunction with the appended drawings. For the purpose of illustrating the aspects of the subject application, there are shown in the drawings aspects that are presently preferred. It should be understood, however, that the subject application is not limited to the precise arrangements and instrumentalities shown.

In the drawings.

DETAILED DESCRIPTION OF THE INVENTION

Reference will now be made in detail to the various aspects of the subject application illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, above, below and diagonal, are used with respect to the accompanying drawings. Such directional terms used in conjunction with the following description of the drawings should not be construed to limit the scope of the invention in any manner not explicitly set forth. Additionally, the term "a," as used in the specification, means "at least one." The terminology includes the words above specifically mentioned, derivatives thereof, and words of similar import.

The terms "grain," "tailing," and "crop material" are used throughout the specification for convenience and it should be understood that these terms are not intended to be limiting. Thus, "grain" refers to that part of a crop that is harvested and separated from waste portions of the crop material.

Figure 1:
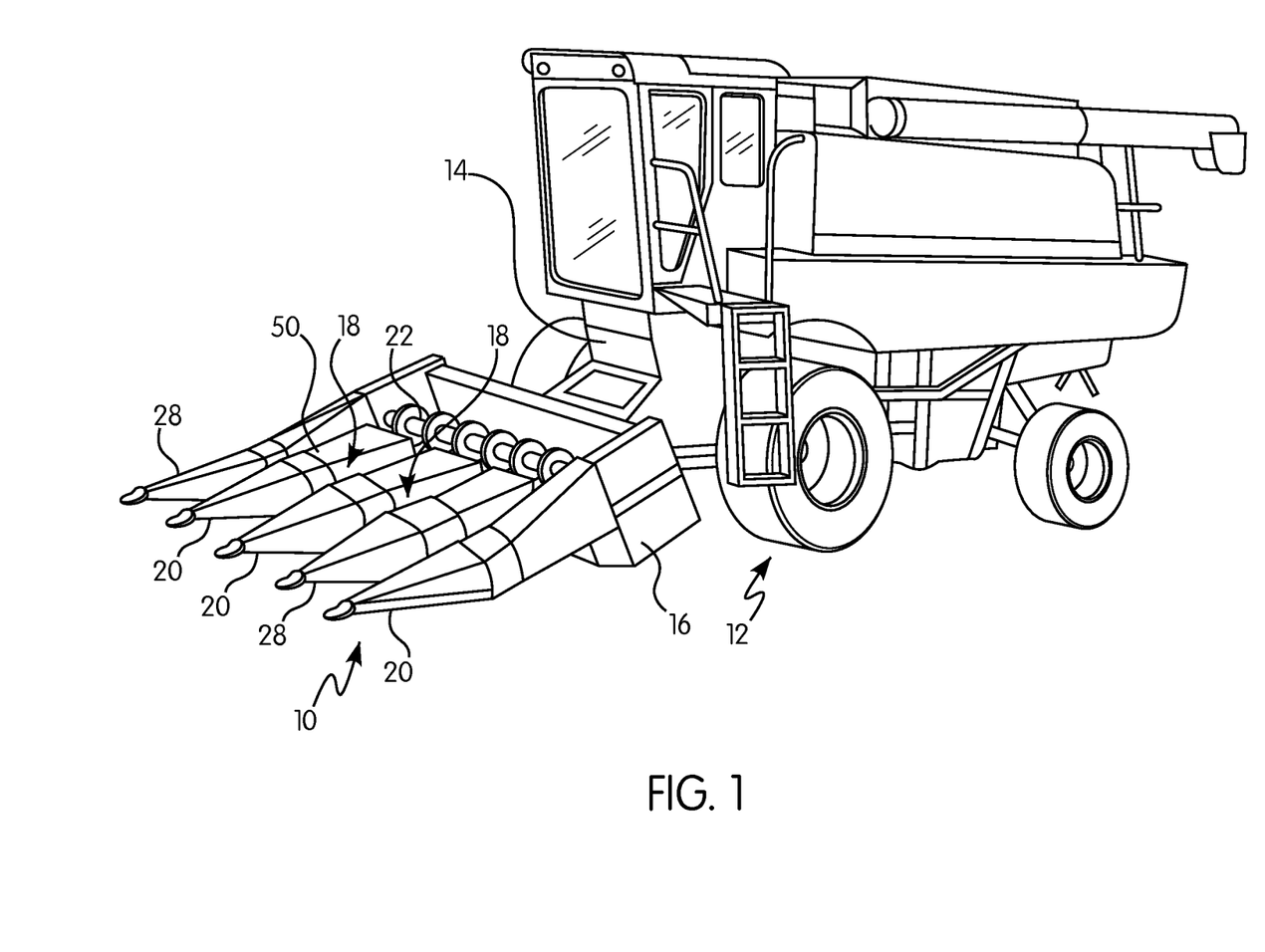
FIG. 1 is a perspective view of an agricultural harvester having a corn header according to an aspect of the subject application.

Referring now to the drawings, wherein preferred embodiments of the present invention are shown, FIG. 1 illustrates a corn header 10 of the present embodiment as applied to an agricultural combine or combine harvester 12. The corn header 10 is shown operatively connected to the combine harvester 12 for harvesting corn and feeding the corn to a feederhouse 14. Such feederhouses and harvesting operations of the combine harvester are known in the art and a further detailed description of their structure, function and operation is not necessary for a complete understanding of the present invention. However, typical corn headers applicable to the present invention are disclosed in U.S. Pat. Nos. 3,808,783 and 3,759,021, the entire disclosures of which are incorporated by reference herein for all purposes. A variety of row dividers also applicable to the present invention are disclosed in U.S. Pat. Nos. 5,195,309, 6,625,969 and 7,073,316, the entire disclosures of which are incorporated by reference herein for all purposes.

Figure 2:
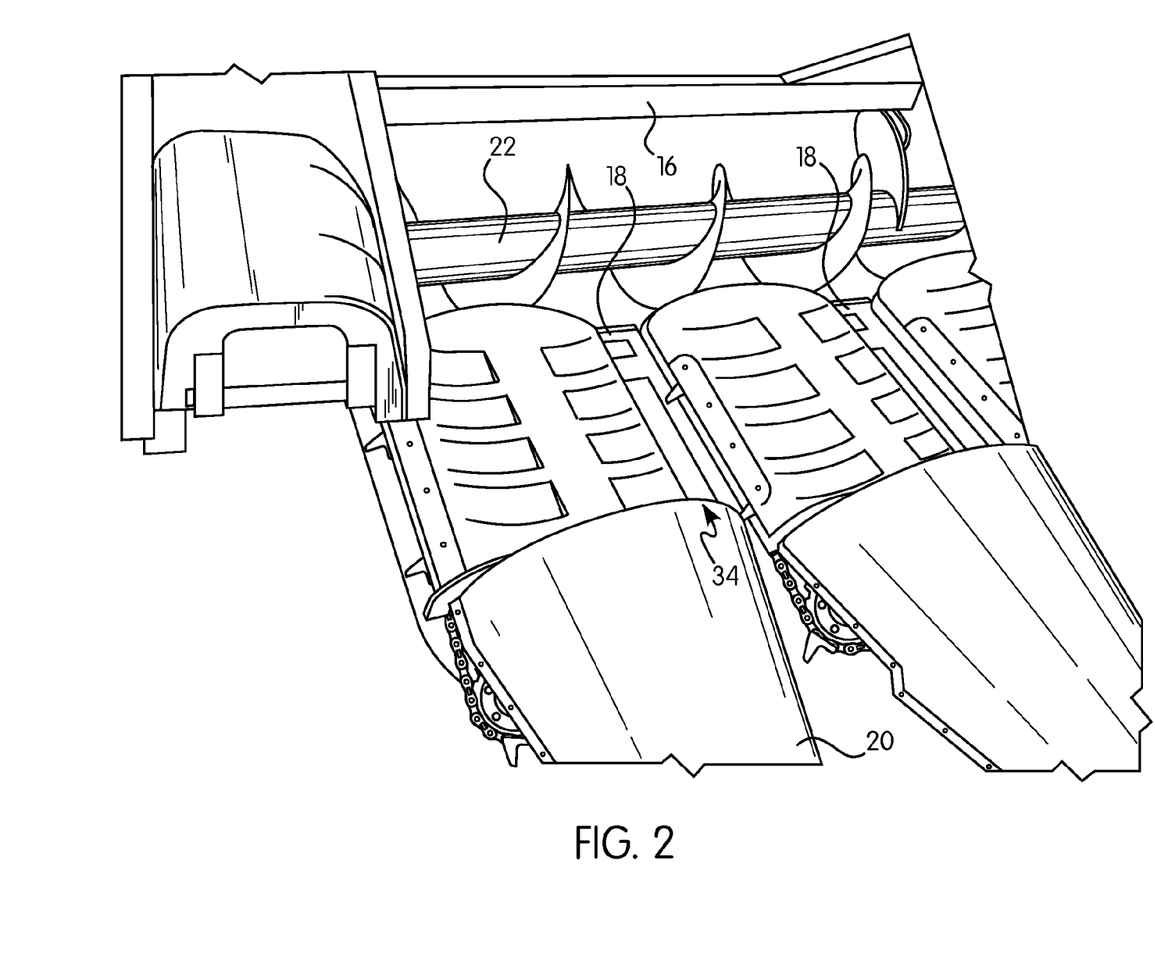
FIG. 2 is an enlarged partial perspective view of the corn header of FIG. 1.
Figure 3:
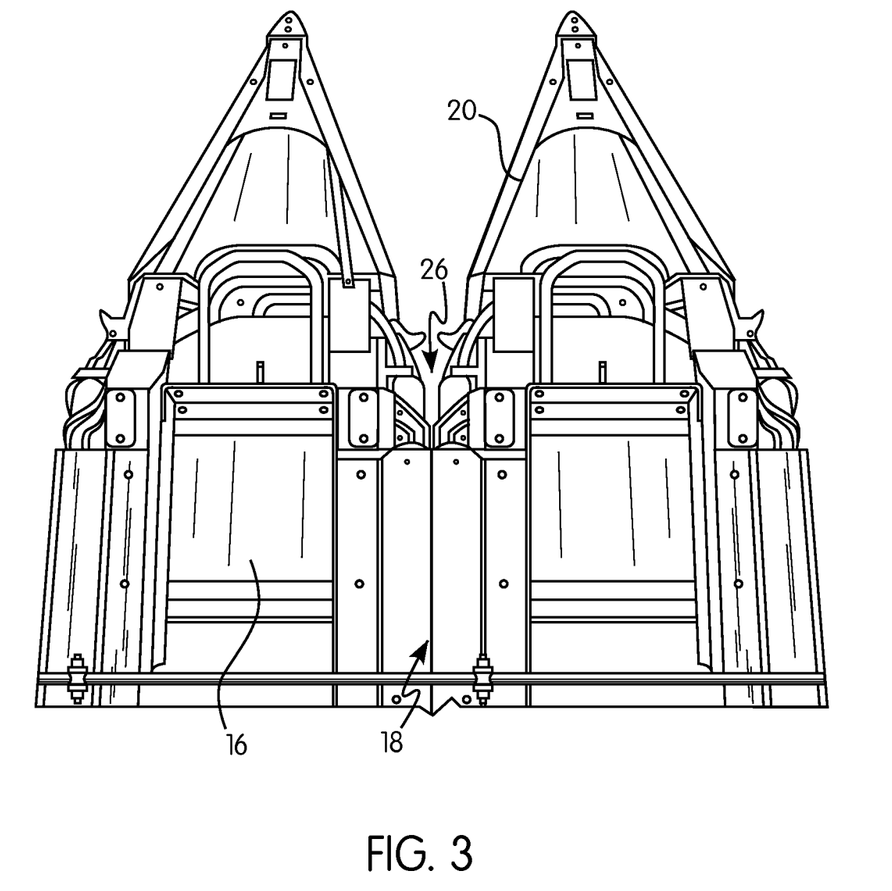
FIG. 3 is an enlarged partial bottom view of the corn header of FIG. 1.
Figure 4:
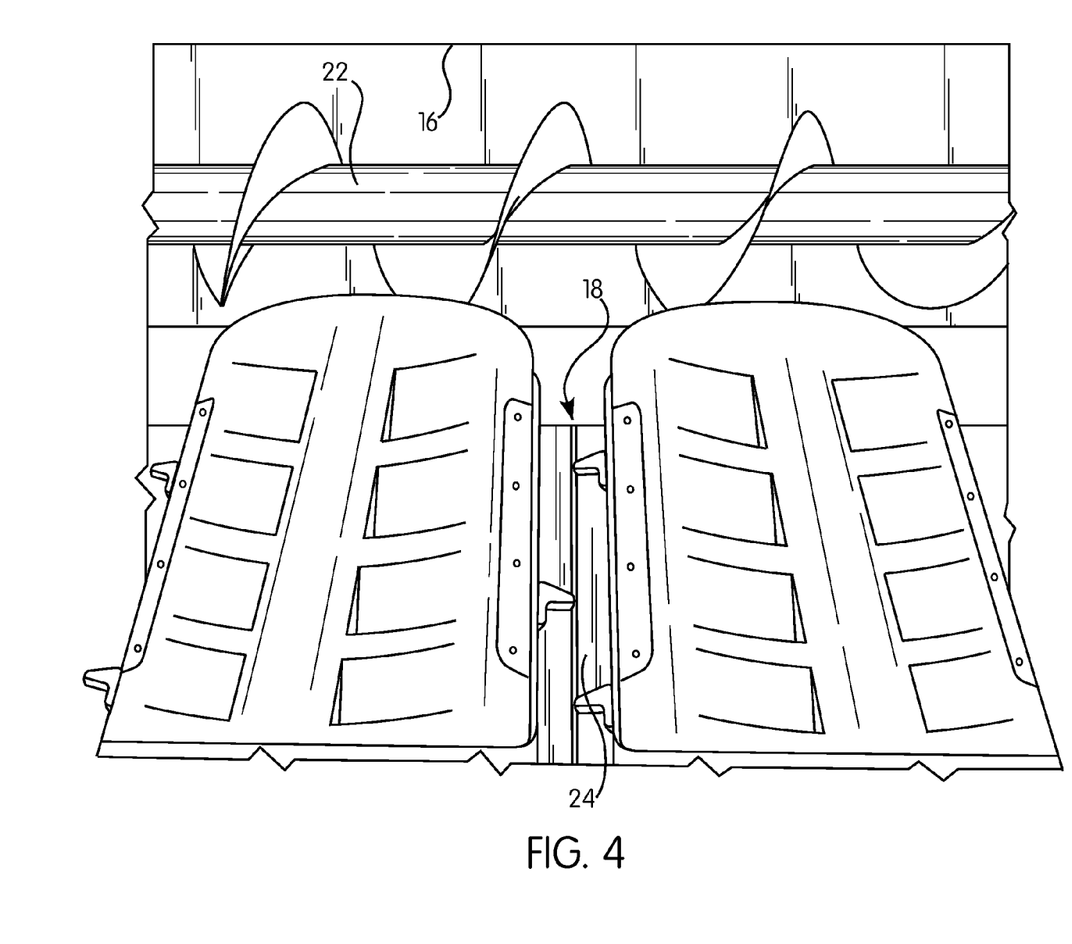
FIG. 4 is an enlarged partial perspective view of the corn header of FIG. 1.

Referring to FIGS. 2 and 4, in accordance with an aspect of the subject application, the corn header 10 includes a frame 16 for mounting to a forward end of the combine harvester 12, a plurality of row units 18 extending forward from the frame 16 and a plurality of row dividers 20. Each row divider 20 is connected to and extends forward of at least one row unit 18. Referring to FIGS. 1-3, the combine harvester 12 includes a conveyor 22, as best shown in FIG. 2. The conveyor 22 conveys grain separated from the stalk by the row units 18 to the feederhouse 14 once the grain is received within a channel of the header below the conveyor 22. The conveyor 22 is connected to the frame 16 about its side walls and is situated within the channel extending between the side walls of the frame 16. As such, grain received within the channel is conveyed towards the feederhouse 14 by the conveyor 22. The conveyor 22 is positioned in front or above a combine feeding location and rearward of the row dividers 20.

Referring to FIGS. 3 and 4, the plurality of row units 18 are each preferably configured as shown. Such row units 18 are known in the art and a further detailed description of their structure, function and operation is not necessary for a complete understanding of the subject application. However, typical row units applicable to the subject application are disclosed in U.S. Pat. Nos. 7,913,480, 7,874,134 and 7,373,767, the entire disclosures of which are incorporated by reference herein for all purposes.

Each of the plurality of row units 18 is attached to the frame 16 and extends in a forward direction from the frame 16 and away from the combine harvester 12. Each row unit 18 includes a deck plate (also commonly known as a stripping plate) 24 mounted to a row unit frame. The stripping plate 24 has a length that extends forward from the frame 16. In operation, crop material is stripped from the stalks as they are pulled within the row unit 18 and enter a gap 26 formed by the stripping plates 24. The stripped crop material is then conveyed to the conveyor 22 owing to the flow of crop material in a rearward direction during harvesting operation. That is, the subsequent flow of crop material entering each row unit 18 pushes/pulls the harvested crop material rearward towards the conveyor 22.

Referring to FIGS. 1-3, the plurality of row dividers 20 extends forward from the frame 16. Such row dividers 20 are known in the art and a further detailed description of their structure, function and operation is not necessary for a complete understanding of the present invention. The row dividers 20 extend forwardly from the frame 16 and are connected to the plurality of row units 18, as shown in FIG. 3, for directing, e.g., a row of corn stalks towards the stripping plate 24 of the row unit 18.

The row dividers 20 include a generally conical-like nose 28. Such noses 28 of the row dividers 20 are known in the art and a further detailed description of their structure, function and operation is not necessary for a complete understanding of the present invention. However, further descriptions of such noses applicable to the present invention are disclosed in U.S. Pat. Nos. 7,240,471 and 7,814,737, the entire disclosures of which are incorporated by reference herein.

Figure 5:
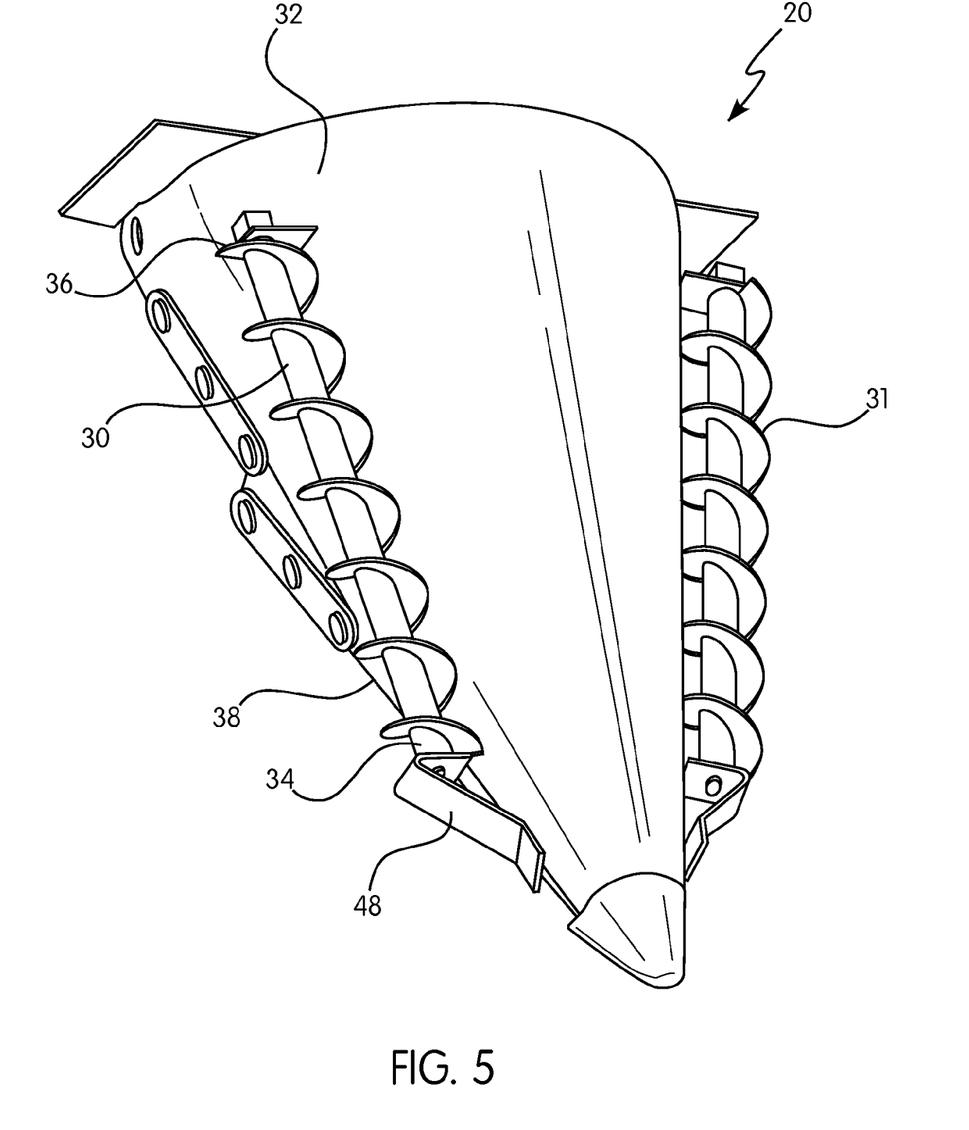
FIG. 5 is a front perspective view of a row divider having conveyors and deflectors in accordance with the subject application.
Figure 6:
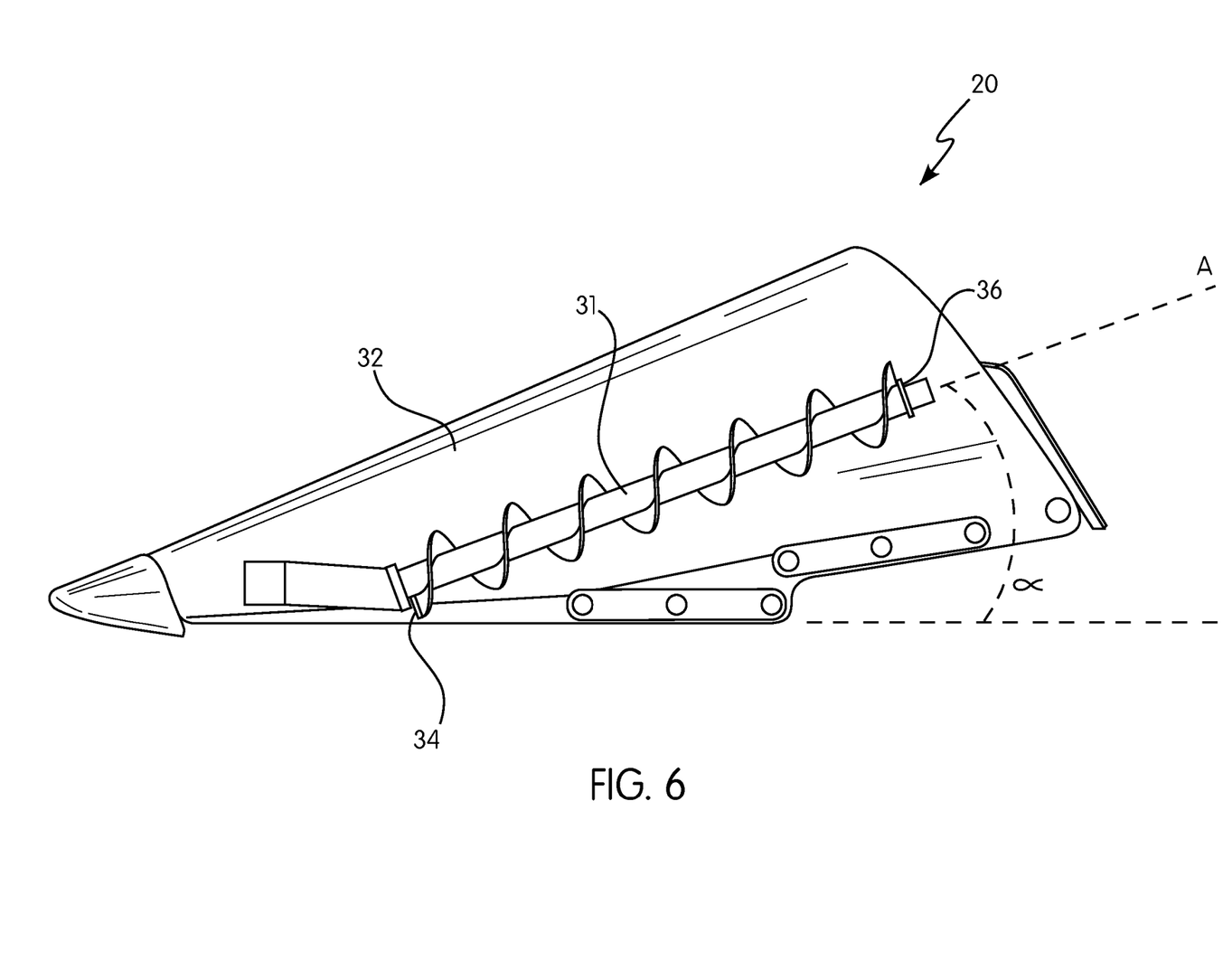
FIG. 6 is a side elevation view of the row divider of FIG. 5.
Figure 7:
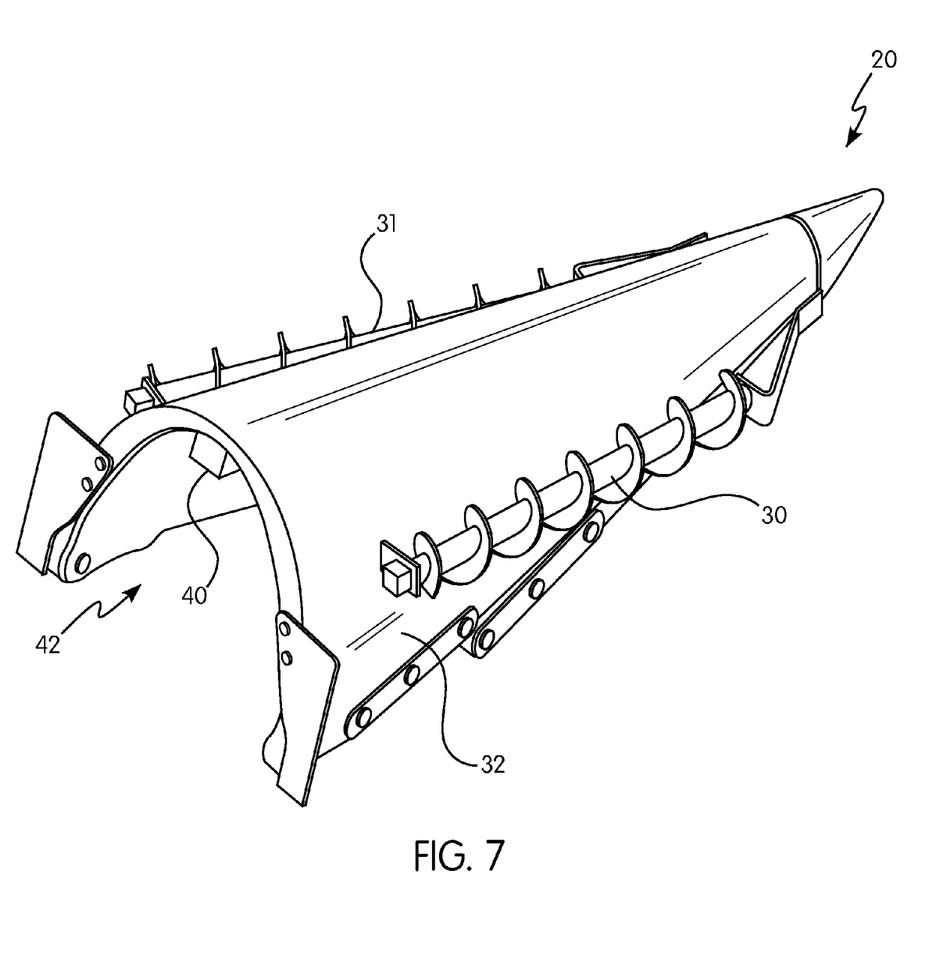
FIG. 7 is an isometric view of the row divider of FIG. 5.

Referring to FIGS. 5-7, each row divider 20 includes at least one conveyor 30 connected to a lateral side 32 of the row divider 20. The conveyor 30, which may preferably take the form of an auger, a conveyor belt, a screw and the like, has a distal end 34 distal from the frame 16 and a proximal end 36 opposite the distal end 34. The proximal end is positioned above the distal end when the row divider is assembled to the corn header. In an aspect, the distal end 34 is adjacent a bottom end 38 of the row divider 20. In accordance with another aspect of the subject application, a longitudinal axis A of the conveyor 30 forms an angle α of about 10-40 degrees and preferably about 10 to 20 degrees from a horizontal place defined e.g., by a bottom edge of the row divider.

In accordance with yet another aspect, each row divider 20 includes a pair of conveyors 30, 31, as shown in FIG. 5. Each conveyor 30, 31 is connected to a respective lateral side 32 of the row divider 20.

The corn header also includes a motor 40 (FIG. 7) operatively connected to the conveyor 30 for providing a motive force e.g., a motive torque force, to the auger 30. Preferably, the motor is positioned near the row divider, and more preferably about a position within a cavity 42 underneath the row divider. Alternatively, the conveyor 30 can be operatively connected to a motor or driving force provided by the combine header, such as the combine's engine.

Figure 8:
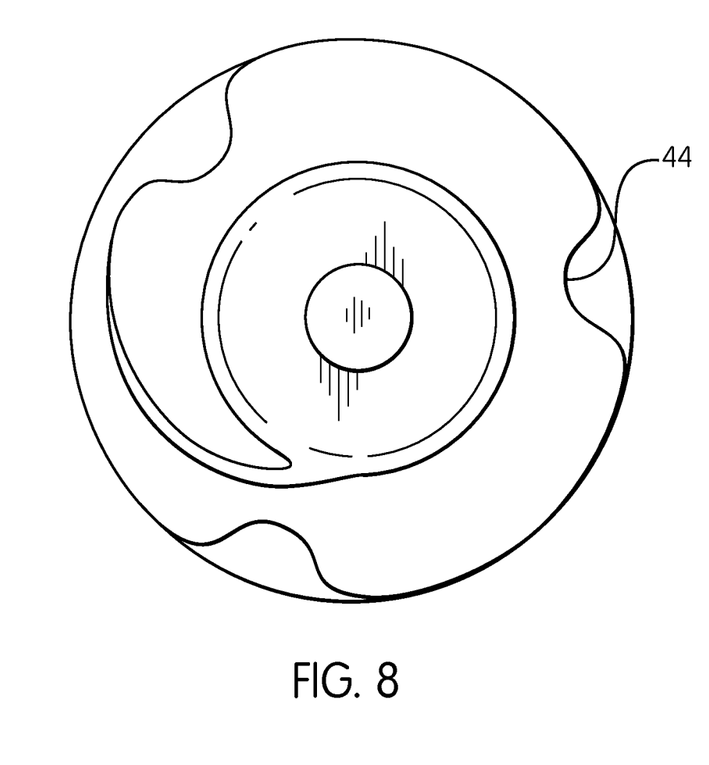
FIG. 8 is a front elevation view of an auger in accordance with an aspect of a conveyor of the subject application.
Figure 9:
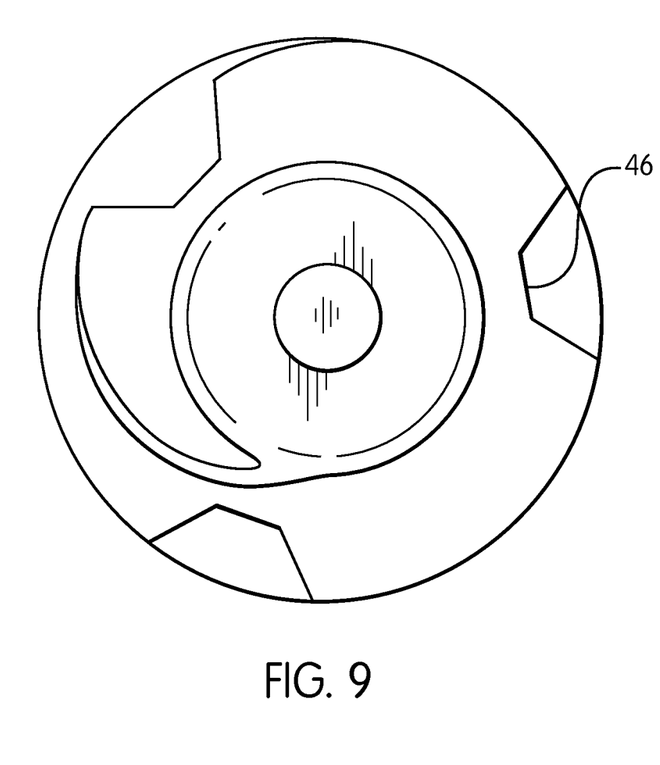
FIG. 9 is a front elevation view of an auger in accordance with another aspect of a conveyor of the subject application.

In accordance with a further aspect, the auger used as the conveyor in the present aspect can advantageously be shaped to dramatically increase its ability to lift and propel crop plants into the corn header. For example, the auger conveyor can be configured with a helical flight having a non-circular profile 44, as shown in FIG. 8. Alternatively, the helical flight can be configured to have a plurality of notches 46 as shown in FIG. 9.

The row divider can optionally include a deflector 48 extending from the distal end 34 of the conveyor to the lateral side 32 of the row divider. The deflector prevents crop plants from entering and becoming lodged in the space between the lateral side of the row divider and the conveyor. The foregoing features of the row divider having a conveyor cooperate to increase the stalk-lifting ability of the corn header for stalks that have fallen sideways into or at irregular angles from a crop row. Once lifted off the ground, the stalks are conveyed into the corn header by the additional force that is provided by the conveyers.

In other words, in accordance with the aspects of the subject application, a row divider 20 for an agricultural combine corn header 10 is provided that includes a front portion 20 and a rear portion 50. The front portion 20 includes lateral side surfaces that taper outwardly from a front end of the front portion towards the rear portion to guide crop material into the header 10, and also includes a conveyor 30 to lift and propel crop material into the header. The rear portion 50 in part connects the row divider to a frame of the corn header. The conveyor 30, which may preferably take the form of an auger, has a distal end 34 distal from the frame 16 and a proximal end 36 opposite the distal end 34. The proximal end is positioned above the distal end. The row divider also includes a motor 40 operatively connected to the conveyor 30 for providing a motive torque force. Several aspects of the row divider and conveyor have been provided in the foregoing detailed description of the subject application, and each aspect adds features that increase the stalk-lifting ability of the corn header for stalks that have fallen sideways into or at irregular angles from a crop row. Once lifted off the ground, the stalks are conveyed into the corn header by the additional thrust force that is provided by the conveyers of the present invention.

The front portion of the row divider can alternatively include a pair of conveyors. Each conveyor being attached to a respective lateral side surface of the front portion. The row divider also includes a deflector attached to the front portion and positioned between the conveyor and the lateral side surface of the front portion.

It will be appreciated by those skilled in the art that changes could be made to the aspects described above without departing from the broad inventive concept thereof. For example, functional equivalents to the auger described in the present invention can be used as the conveyor. It is to be understood, therefore, that this invention is not limited to the particular aspects disclosed, but it is intended to cover modifications within the spirit and scope of the present invention as defined by the appended claims.

I claim:

1. A corn header for a combine harvester comprising:
   a frame for mounting to a forward end of the combine harvester;
   a plurality of row units extending forward from the frame; and
   a plurality of row dividers for guiding crop plants toward the row units, each row divider pivotally connected to and extending forward of at least one row unit, wherein each row divider includes a pair of conveyors, each conveyor connected to a respective lateral side of the row divider.

2. The corn header of claim 1, wherein at least one of the pair of conveyors includes a distal end distal from the frame and a proximal end opposite the distal end, and wherein the proximal end is positioned above the distal end.

3. The corn header of claim 2, wherein a longitudinal axis of at least one of the pair of conveyors forms an angle of about 15-40 degrees from a horizontal ground surface.

4. The corn header of claim 2, wherein the distal end is adjacent a bottom end of the row divider, and adjacent an apex of the row divider.

5. The corn header of claim 1, further comprising a motor operatively connected to at least one of the pair of conveyors for providing a motive force.

6. The corn header of claim 1, wherein at least one of the pair of conveyors includes a deflector extending from a distal end of the conveyor to the lateral side of the row divider.

7. The corn header of claim 1, wherein at least one of the pair of conveyors is an auger.

8. The corn header of claim 7, wherein the auger includes a helical flight having a non-circular profile.

9. The corn header of claim 1, wherein the row divider includes lateral sides that taper outwardly, and at least one of the pair of conveyors extends substantially along an entire longitudinal extent of the lateral side.

10. A row divider for an agricultural combine corn header comprising:
    a rear end for connection to a row unit connected to a frame of a corn header;
    a front portion extending forwardly from the rear end, the front portion including lateral side surfaces that taper outwardly from a front end of the front portion towards the rear end; and
    a pair of conveyors, each conveyor attached to a respective lateral side surface of the front portion.

11. The row divider of claim 10, wherein at least one of the pair of conveyors includes a distal end distal from the rear end and a proximal end opposite the distal end, and wherein the proximal end is positioned above the distal end.

12. The row divider of claim 11, wherein a longitudinal axis of at least one of the pair of conveyors forms an angle of about 15-40 degrees from a horizontal plane.

13. The row divider of claim 11, wherein the distal end is adjacent a bottom end of the row divider.

14. The row divider of claim 10, further comprising a motor operatively connected to at least one of the pair of conveyors for providing a motive torque force.

15. The row divider of claim 10, further comprising a deflector attached to the front portion and positioned between at least one of the pair of conveyors and the lateral side surface of the front portion.

16. The row divider of claim 10, wherein at least one of the pair of conveyors is an auger.

17. The row divider of claim 16, wherein the auger includes a helical flight having a non-circular profile, and wherein an entirety of the helical flight is spaced from one of the lateral sides.

18. A corn header for a combine harvester comprising:
    a frame for mounting to a forward end of the combine harvester;
    a plurality of row units extending forward from the frame, each row unit including a gathering chain; and
    a plurality of row dividers for guiding crop plants toward the row units, each row divider connected to and extending forward of at least one row unit, wherein each row divider includes a pair of conveyors, each conveyor connected to a respective lateral side of the row divider having a longitudinal axis at a nonparallel angle relative to a longitudinal axis of the gathering chain.

19. The corn header of claim 18, wherein an entirety of at least one of the pair of conveyors is positioned forwardly of the gathering chain.

* * * * *